United States Patent [19]
McHenry, III

[11] 3,778,714

[45] Dec. 11, 1973

[54] APPARATUS FOR DETECTING AND COUNTING COINCIDENCE OF INCOMING LOGIC SIGNALS

[76] Inventor: Norman McHenry, III, 3434 Cunard Ct., San Jose, Calif. 95132

[22] Filed: May 30, 1972

[21] Appl. No.: 258,132

[52] U.S. Cl. .............................. 324/181, 324/73 R
[51] Int. Cl. ........................ G01r 15/12, G04f 9/00
[58] Field of Search....................... 324/181, 73, 158, 324/186; 307/203; 340/146.2

[56] References Cited
UNITED STATES PATENTS
3,599,098  8/1971  McPhail............................ 324/73 X
3,431,490  3/1969  Kwap et al...................... 324/186 X Primary Examiner—Alfred E. Smith
Attorney—Jack M. Wiseman

[57] ABSTRACT

Apparatus for trouble shooting digital circuits in which the repetition rate of coincidence between compared logic signals is not sufficient for the operation of an oscilloscope. A comparator circuit for the apparatus produces signals representing the existence of coincidence of compared incoming signals. A light emitting diode connected to the comparator circuit is operated when all the compared incoming signals are coincident at least for a prescribed duration. In addition, a counter circuit is connected to the comparator circuit. Light emitting diodes for the counter circuit are operated for indicating the count of the compared signals that are coincident for at least a prescribed time duration.

15 Claims, 2 Drawing Figures

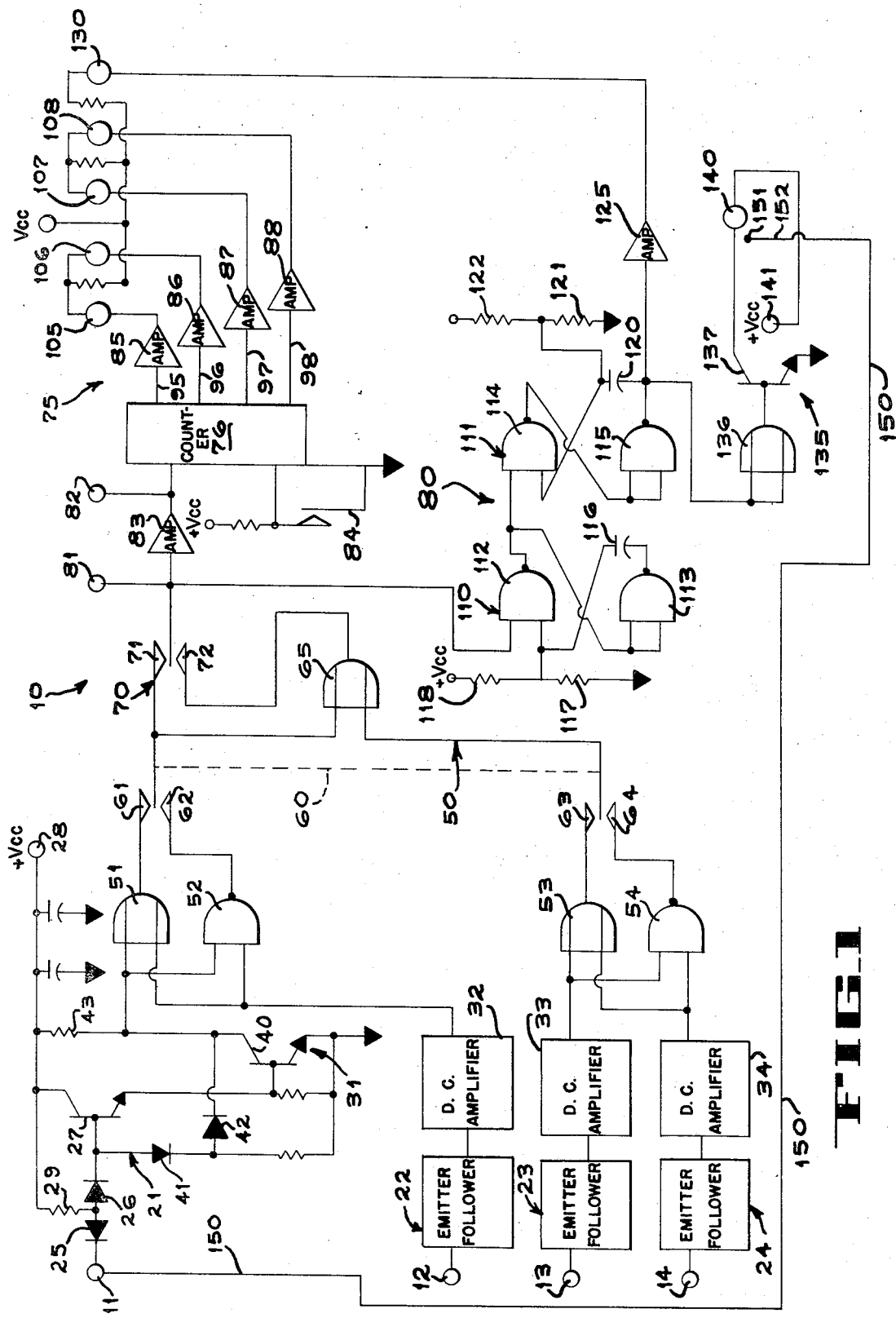

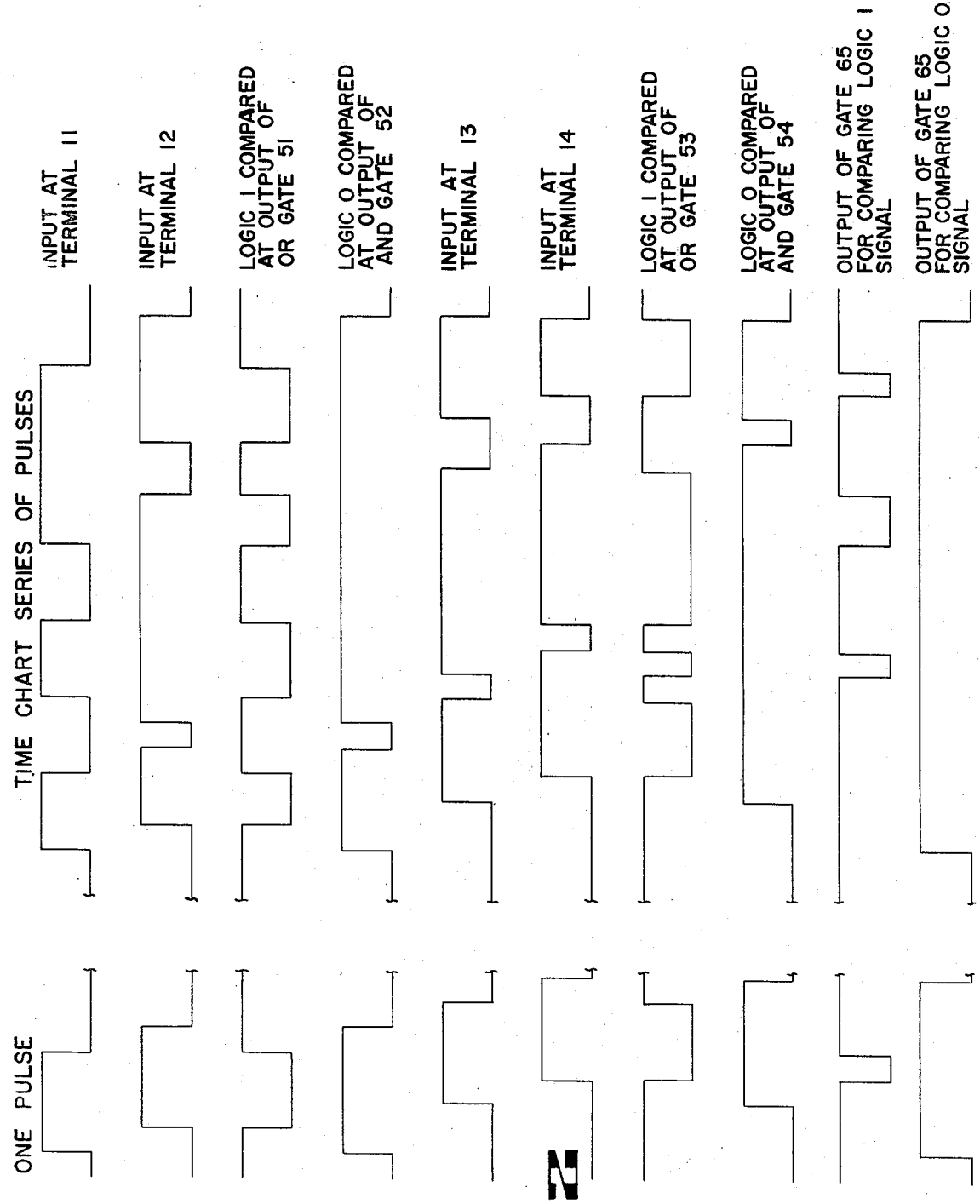

APPARATUS FOR DETECTING AND COUNTING COINCIDENCE OF INCOMING LOGIC SIGNALS

BACKGROUND OF THE INVENTION

The present invention relates in general to apparatus for trouble shooting digital circuits and more particularly to apparatus for indicating the coincidence of compared incoming signals.

It is desirable in the trouble shooting of digital circuits to detect the coincidence of compared incoming logic or digital signals when the repetition of rate of coincidence of compared incoming signals is insufficient to appear on an oscilloscope.

SUMMARY OF THE INVENTION

Apparatus for detecting the duration of coincidence of compared incoming signals when the duration of or repetition rate of coincidence is relatively low.

A feature of the present invention is the detection of the existence of coincidence of compared incoming signals when the repetition rate of duration of coincidence is insufficient for display on an oscilloscope.

The apparatus of the present invention is capable of detecting the coincidence of compared incoming digital signals when the duration of coincidence is at least 28 nanoseconds.

Another feature of the present invention is the signalling by positive identification to an operator of the presence of coincidence for a prescribed duration of compared incoming logic signals.

The apparatus of the present invention signals by positive identification to an operator when the duration of coincidence of compared incoming signals is less than 5 $MH_z$ for pulse train signals.

Further, the apparatus of the present invention will provide a visible count of the number of coincidences of compared incoming signals each of a duration of coincidence at least of a prescribed period.

DESCRIPTION OF THE DRAWINGS

FIG. 1 is a schematic diagram of the logic comparator and counter circuit embodying the present invention.

FIG. 2 is a graphic illustration of a time chart for the circuit shown in FIG. 1.

DESCRIPTION OF THE PREFERRED EMBODIMENTS

Illustrated in FIG. 1 is the logic comparator and counter circuit 10 of the present invention which comprises digital or logic input terminals 11–14. Incoming digital or logic signals are applied respectively to the terminals 11–14. Connected to the terminals 11–14 are emitter follower circuits 21–24. The emitter follower circuits 21–24 are similar in construction and in operation and, hence, only the emitter follower circuit 21 will be described in detail.

The emitter follower circuit 21 comprises back-to-back diodes 25 and 26 which protect a transistor 27 against excessive voltage surges. A d.c. source of 5 volts d.c. at 300 milliamps is connected to a terminal 28 for supplying a d.c. potential to the collector electrode of the transistor 27. The base of the transistor 27 is also connected to the terminal 28 through a resistor 29 and the diode 26. The purpose of the emitter follower circuit 21 is to present a minimum load to the circuit under test that provides the incoming logic or digital signal.

Connected to the output of the emitter follower circuits 21–24 are d.c. amplifier circuits 31–34, respectively. The d.c. amplifier circuits 31–34 are similar in construction and operate in a similar manner. Thus, only the d.c. amplifier 31 will be described in detail.

The d.c. amplifier 31 comprises a transistor 40. The output of the emitter follower 21 is taken from the emitter electrode of the transistor 27 and is applied to the base electrode of the transistor 40. Diodes 41 and 42 are feedback diodes and reduce the time of the emitter follower 21 and the d.c. amplifier 31 to the incoming signal that is applied to the terminal 11. The emitter of the transistor 40 is connected to a source of negative potential as shown in the drawing. The output of the d.c. amplifier 21 is taken from the collector electrode of the transistor 40, which is connected to the 5V d.c. supply through a resistor 43. The d.c. amplifiers 31–34 invert the incoming digital signals for presentation to a comparator circuit 50 and also ensure a proper signal level for presentation to the comparator circuit 50.

The comparator circuit 50 is connected to the output of the d.c. amplifiers 31–34 for detecting coincidence between compared logic zero signals or compared logic one signals of a coincidence duration in excess of a predetermined time duration such as 28 nanoseconds, which signals are applied to the terminals 11–14 as incoming digital or logic signals under test. The comparator circuit 50 comprises an OR gate 51 and a NAND gate 52. The OR gate 51 has one input thereof connected to the output of the d.c. amplifier 31 and another input thereof connected to the output of the d.c. amplifier 32. The NAND gate 52 is similarly connected to the output of the d.c. amplifiers 31 and 32. Thus, the OR gate 51 and the NAND gate 52 compare the incoming digital signals applied to the terminals 11 and 12 for coincidence duration in excess of 28 nanoseconds. The OR gate 51 compares the incoming digital signals applied to the terminals 11 and 12 for coincidence of logic one signals of a coincidence duration in excess of 28 nanoseconds and the NAND gate 52 compares the incoming digital signals applied to the terminals 11 and 12 for coincidence of logic zero signals of a coincidence duration in excess of 28 nanoseconds.

In a similar manner, the comparator circuit 50 comprises OR gate 53 and NAND gate 54. The OR gate 53 has one input thereof connected to the output of the d.c. amplifier 33 and another input thereof connected to the output of the amplifier 34. The NAND gate 54 is similarly connected to the output of the d.c. amplifiers 33 and 34. Thus, the OR gate 53 and the NAND gate 54 compare the incoming digital signals applied to the terminals 13 and 14 for coincidence duration in excess of 28 nanoseconds. The OR gate 53 compares the incoming digital signals applied to the terminals 13 and 14 for coincidence of logic one signals for a coincidence duration in excess of 28 nanoseconds and the NAND gate 54 compares the incoming digital signals applied to the terminals 13 and 14 for coincidence of logic zero signals of a coincidence duration in excess of 28 nanoseconds.

When logic one signals are applied to the terminals 11 and 12 of a coincidence duration in excess of 28 nanoseconds, a logic 0 pulse output is produced in the output of the OR gate 51 (FIG. 2). When logic zero signals are applied to the terminals 11 and 12 of a coincidence duration in excess of 28 nanoseconds, a logic 0 pulse output (FIG. 2) is produced in the output of the NAND gate 52. If logic one signals are applied to the terminals 13 and 14 of a coincidence duration in excess of 28 nanoseconds, a logic 0 pulse is produced in the output of the OR gate 53. Should logic 0 signals be applied to the terminals 13 and 14 of a coincidence duration in excess of 28 nanoseconds, a logic 0 pulse signal (FIG. 2) is produced in the output of the NAND gate 54. In the exemplary embodiment, a logic 0 pulse is at a ground potential and the logic 1 pulse is at a positive 5 volt potential.

A suitable double pole-double throw switch 60 with contacts 61–64 is connected to the output of the gates 51–54. When the contacts 61 and 63 are closed, the comparator circuit 50 tests for coincidence of logic 1 signals of a coincidence duration in excess of 28 nanoseconds and when the contacts 62 and 64 are closed, the comparator circuit 50 tests for coincidence of logic 0 signals of a coincidence duration in excess of 28 nanoseconds.

With the contacts 61 and 63 closed, a logic 0 pulse signal is produced in the output of the OR gate 51 for transmission through the contacts 61 of the switch 60 upon the application of logic 1 signals to the terminals 11 and 12 of a coincidence duration in excess of 28 nanoseconds and a logic 0 pulse signal is produced in the output of the OR gate 53 for transmission through the contacts 63 of the switch 60 upon the application of logic 1 signals to the terminals 12 and 13 of a coincidence duration in excess of 28 nanoseconds. With the contacts 62 and 64 closed, a logic 0 pulse signal is produced in the output of the NAND gate 52 for transmission through the contacts 62 of the switch 60 upon the application of logic 0 signals to the terminals 11 and 12 of a coincidence duration in excess of 28 nanoseconds and a logic 0 pulse signals is produced in the output of the NAND gate 54 for transmission through the contacts 64 of the switch 60 upon the application of logic 0 signals to the terminals 13 and 14 of a coincidence duration in excess of 28 nanoseconds.

The comparator circuit 50 also includes an OR gate 65. One input of the OR gate 65 is optionally connected to either the output of the OR gate 51 or the NAND gate 52 through the selective closing of contacts 61 or contacts 62 of the switch 60. Another input of the OR gate 65 is optionally connected to either the output of the OR gate 53 or the NAND gate 54 through the selective closing of contacts 63 or the contacts 64 of the switch 60. The output of the OR gate 65 and either the contacts 61 and the contacts 62 of the switch 60 are connected to a single pole-double throw switch 70 having contacts 71 and 72. When the contacts 71 are closed, the comparator circuit 50 tests the coincidence of the digital signals applied to the terminals 11 and 12. When the contacts 72 are closed, the comparator circuit 50 tests the coincidence of the digital signals applied to the terminals 11–14 by comparing either the coincidence between the output signals of the OR gates 51 and 53 or the coincidence between the output signals of the NAND gates 52 and 54. The open contacts 71 cause all paths of comparison signals to go to the OR gate 65.

When the contacts 61 and 71 are closed, a logic 0 pulse signal is transmitted through the switch 70 upon the application of logic one signals to the terminals 11 and 12 of a coincident duration in excess of 28 nanoseconds. If the contacts 62 and 71 are closed, a logic 0 pulse signal is transmitted through the switch 70 upon the application of logic 0 signals to the terminals 11 and 12 of a coincident duration in excess of 28 nanoseconds.

Should the contacts 61, 63 and 72 be closed, a pulse signal is transmitted through the switch 70 upon the application of logic 1 signals to the terminals 11–12 and the application of logic 1 signals to the terminals 13–14 of a coincident duration in excess of 28 nanoseconds for the respective comparisons and a coincident duration in excess of 28 nanoseconds for the resulting compared signals. When the contacts 62, 64 and 72 are closed, a pulse signal is transmitted through the switch 70 upon the application of logic 0 signals to the terminals 11–12 and the application of logic 0 signals to the terminals 13–14 of a coincident duration in excess of 28 nanoseconds for the respective comparisons and a coincident duration in excess of 28 nanoseconds for the resulting compared signals.

Connected to the output of the comparator circuits 50 and specifically the switch 70 thereof is a counter circuit 75, a pulse stretching circuit 80 and test terminals 81 and 82. The test terminal 81 is connected to the output side of the switch 70 to provide trigger pulses for external test equipment. The test terminal 82 is connected to the switch 70 through an inverter circuit 83 to provide trigger pulses of opposite polarity for external test equipment.

The counter circuit 75 comprises a serial four bit counter 76 that is connected in the wrap around mode or as an endless ring counter so that the counter returns to zero and begins to count again after the fifteenth pulse is counted. The counter 76 counts on the rising edge of any pulse of 5 nanoseconds duration or longer transmitted from the inverter circuit 83. The output of the counter 76 is in the binary form. A reset pushbutton switch 84 is connected to the counter 76 for returning the same to zero.

Inverter-driver circuits 85–88 are connected respectively to the output of the counter 76 over four output conductors 95–98. The inverter-driver circuits 85–88 form desired edge signals because the counter 76 is triggered on the rising edges of the input pulses. Connected to the output of the inverter-driver circuits 85–88 are light emitting diodes 105–108, respectively. Thus, the light emitting diodes 105–108 are selectively illuminated to provide a count of the coincidence of incoming digital signals under test when the duration of coincidence for compared signals exceeds 28 nanoseconds.

The pulse stretching circuit 80 comprises a pair of flip-flop circuits 110 and 111. The flip-flop circuit 110 includes NAND gates 112 and 113 connected as a monostable one shot multivibrator circuit. Each change of polarity of signal through the switch 70 changes the state of the NAND gate 112. Each time the NAND gate 112 returns to its initial state, the NAND gate 113 is "on" for a duration of time determined by the R-C network including a capacitor 116 and resistors 117 and 118. The flip-flop circuit 111 includes NAND gates 114 and 115 connected as a monostable one shot multivibrator circuit. Each time the NAND gate 113 returns to its initial state, the NAND gate 115 is "on" for a duration of time determined by the R-C network including a capacitor 120 and resistors 121 and 122. Thus, each signal or change of polarity transmitted through the switch 70 of a duration in excess of 10 nanoseconds will be stretched to the time constants of the R-C networks of the NAND gates 113 and 114.

Connected to the output of the NAND gate 115 of the flip-flop circuit 111 is an inverter-driver circuit 125, which has its output connected to the input side of a light emitting diode 130. The illumination of the light emitting diode 130 indicates that the compared incoming digital signals under test have a coincidence duration in excess of 28 nanoseconds.

Also connected to the output of the NAND gate 115 of the flip-flop circuit 111 is a circuit probe 135. The circuit probe 135 includes an OR gate 136 which has its input side connected to the output of the NAND gate 115. A NPN transistor 137 is connected to the output side of the OR gate 136 to illuminate an incandescent lamp 140 through a 5 volt source of potential applied to a terminal 141. The lamp 140 is located at the end of the circuit probe 135. The circuit probe 135 has a base tip 151 that is connected through a shielded cable 152 to a microribbon connector 150 at the terminal 11. The lamp 140, the brass tip 151 and the shielded cable 152 are contained in a plastic housing. The circuit probe 135 offers alternative input for probing a circuit board for signals. The lamp 140 provides positive identification of coincident conditions met at the circuit under test. Thus, the probing of circuits is facilitated and offers positive results in close proximity to the circuit under test.

A light emitting diode is a fast reaction device and it becomes difficult at times to determine under rapid repetition rates whether the light emitting diode is on or pulsing. The incandescent lamp 140 on the other hand will decrease in intensity and change color under rapid pulse conditions and is, therefor, a better indicator of high frequency signals.

The operation of the OR gate 51 when the contacts 61 and 63 are closed can be seen from the following truth table (Boolean: A.B=C):

| Terminal 11 | Terminal 12 | Output of the OR Gate 51 |
|---|---|---|
| 1 | 1 | Logic 0 |
| 1 | 0 | Logic 1 |
| 0 | 1 | Logic 1 |
| 0 | 0 | Logic 1 |

The OR gate 53 truth table is similar to the above.

The operation of the NAND gate 52 when the contacts 62 and 64 are closed can be seen from the following truth table (Boolean: A.B=C):

| Terminal 11 | Terminal 12 | Output of the NAND Gate 52 |
|---|---|---|
| 1 | 1 | Logic 1 |
| 1 | 0 | Logic 1 |
| 0 | 1 | Logic 1 |
| 0 | 0 | Logic 0 |

The NAND gate 54 truth table is similar to the above.

It is to be observed that the logic probe 151 may be used as a single input device by connecting the terminals 11 and 12. Under these conditions, the probe 151 will function to detect logic 0 or logic 1 at any position of the switch 60, provided by the contact 71 if the switch 70 is closed. The counter 75 will then count on each positive rising edge of the incoming pulse.

I claim:

1. Apparatus for detecting coincidence of incoming logic signalS comprising:
   a. first means for receiving a first logic signal;
   b. second means for receiving a second logic signal;
   c. comparator circuit connected to said first and second means and including means for producing a first pulse signal in response to said first and second logic signals having a duration of coincidence in excess of a predetermined time period; and
   d. circuit means connected to said comparator circuit for indicating to an operator that the signals exceeds the predetermined time period.

2. Apparatus as claimed in claim 1 wherein said comparator circuit includes a first gate circuit for comparing the existence of coincidence of logic 1 signals and a second gate circuit for comparing the existence of coincidence of logic 0 signals.

3. Apparatus for detecting coincidence of incoming logic signals comprising:
   a. first means for receiving a first logic signal;
   b. second means for receiving a second logic signal;
   c. comparator circuit connected to said first and second means for producing a first pulse signal in response to said first and second logic signals having a duration of coincidence in excess of a predetermined time period, said comparator circuit including a first gate circuit for comparing the existence of coincidence of logic 1 signals and a second gate circuit for comparing the existence of coincidence of logic 0 signals, said comparator circuit including switching means for advancing either the output of said first gate circuit or the output of said second gate circuit; and
   d. circuit means connected to said comparator circuit for indicating to an operator that the duration of coincidence for said first and second logic signals exceeds the predetermined time period.

4. Apparatus for detecting coincidence of incoming logic signals comprising:
   a. first means for receiving a first logic signal;
   b. second means for receiving a second logic signal;
   c. comparator circuit connected to said first and second means for producing a first pulse signal in response to said first and second logic signals having a duration of coincidence in excess of a predetermined time period;
   d. circuit means connected to said comparator circuit for indicating to an operator that the duration of coincidence for said first and second logic signals exceeds the predetermined time period;
   e. third means for receiving a third logic signal; and
   f. fourth means for receiving a fourth logic signal,
   said comparator circuit being also connected to said third and fourth means to produce a second pulse signal in response to said third and fourth logic signals having a duration of coincidence in excess of said predetermined time period,
   said comparator circuit comparing said first and second pulse signals to produce a third pulse signal in response to said first and second pulse signals having a duration of coincidence in excess of said predetermined time period,
   said comparator circuit including first switching means for at times connecting the output of said comparator circuit to said circuit means for said circuit means to indicate to an operator that the duration of coincidence for said first and second logic signals exceeds the predetermined time period and at other times connecting the output of said comparator circuit to said circuit means to indicate to an operator that the duration of coincidence of all compared signals are in excess of said predetermined time period.

5. Apparatus as claimed in claim 4 wherein said comparator circuit comprises a first gate circuit for comparing the existence of coincidence of logic 1 signals received by said first and second means, a second gate circuit for comparing the existence of coincidence of logic 0 signals received by said first and second means, a third gate circuit for comparing the existence of coincidence of logic 1 signals received by said third and fourth means, a fourth gate circuit for comparing the existence of coincidence of logic 0 signals received by said third and fourth means, second switching means for advancing at times the output of said first and third gate circuits and for advancing at other times the output of said second and fourth gate circuits, and a fifth gate circuit for comparing the existence of coincidence of the signals advanced through said second switching means.

6. Apparatus as claimed in claim 3 and comprising a counter circuit connected to said comparator circuit for indicating the number of said first and second logic signals with logic signals of a duration of coincidence exceeding the predetermined time period.

7. Apparatus as claimed in claim 5 and comprising a counter circuit connected to said comparator circuit for indicating the number of signals advanced through said first switching means that have a duration of coincidence exceeding the predetermined time period.

8. Apparatus as claimed in claim 3 wherein said circuit means includes a pulse stretching circuit.

9. Apparatus as claimed in claim 5 wherein said circuit means includes a pulse stretching circuit.

10. Apparatus as claimed in claim 3 and comprising a circuit probe connected to said circuit means.

11. Apparatus as claimed in claim 10 wherein said circuit probe includes a lamp.

12. Apparatus as claimed in claim 5 and comprising a circuit probe connected to said circuit means.

13. Apparatus as claimed in claim 12 wherein said circuit probe includes a lamp.

14. Apparatus as claimed in claim 3 wherein each of said first and second means includes an emitter follower circuit.

15. Apparatus as claimed in claim 5 wherein each of said first, second, third and fourth means includes an emitter follower circuit.

* * * * *